No. 856,457. PATENTED JUNE 11, 1907.
J. FEEHERY.
GRAIN BIN VENTILATOR.
APPLICATION FILED MAR. 1, 1907.
2 SHEETS—SHEET 1.
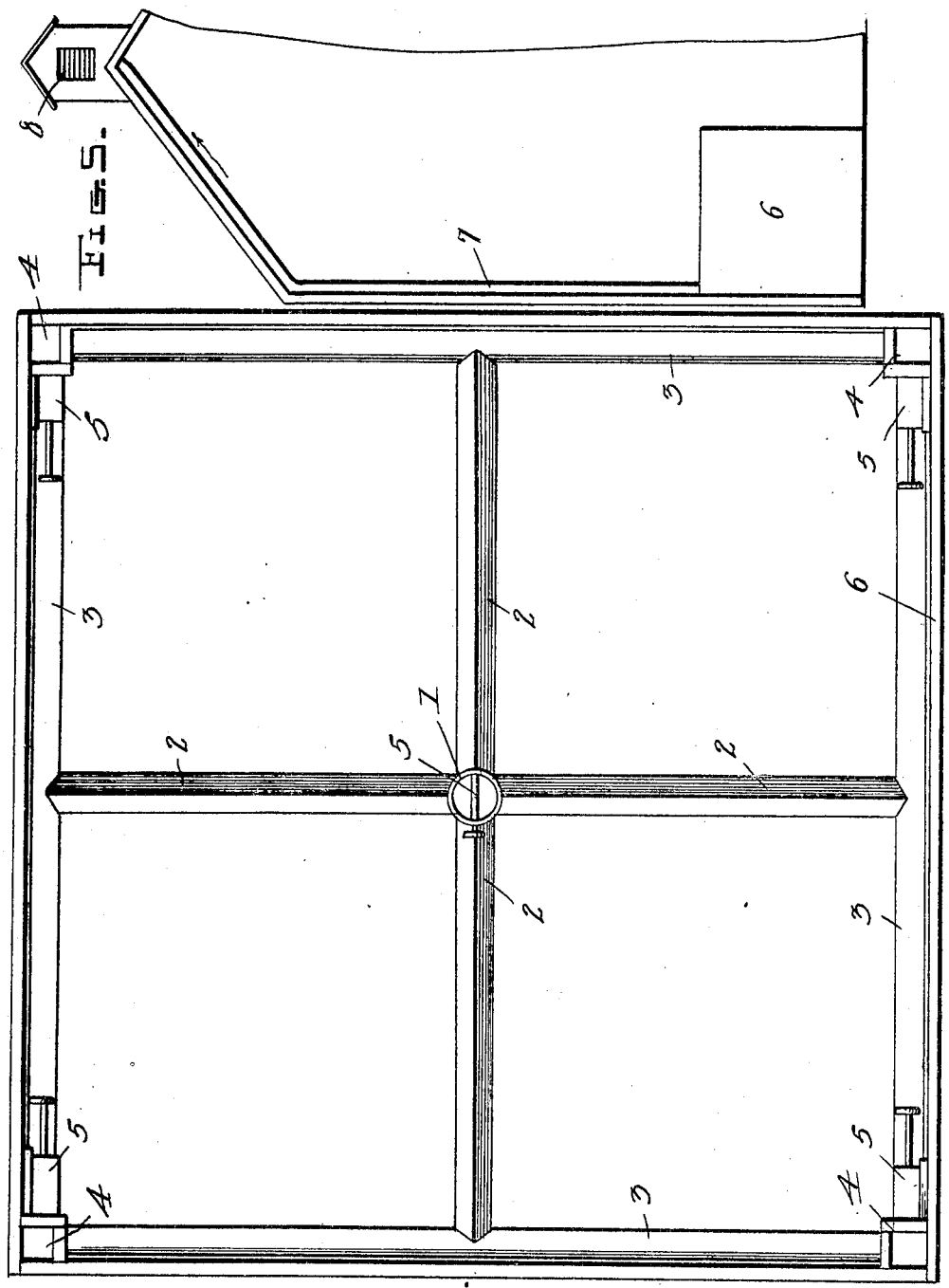

No. 856,457. PATENTED JUNE 11, 1907.
J. FEEHERY.
GRAIN BIN VENTILATOR.
APPLICATION FILED MAR. 1, 1907.
2 SHEETS—SHEET 2.
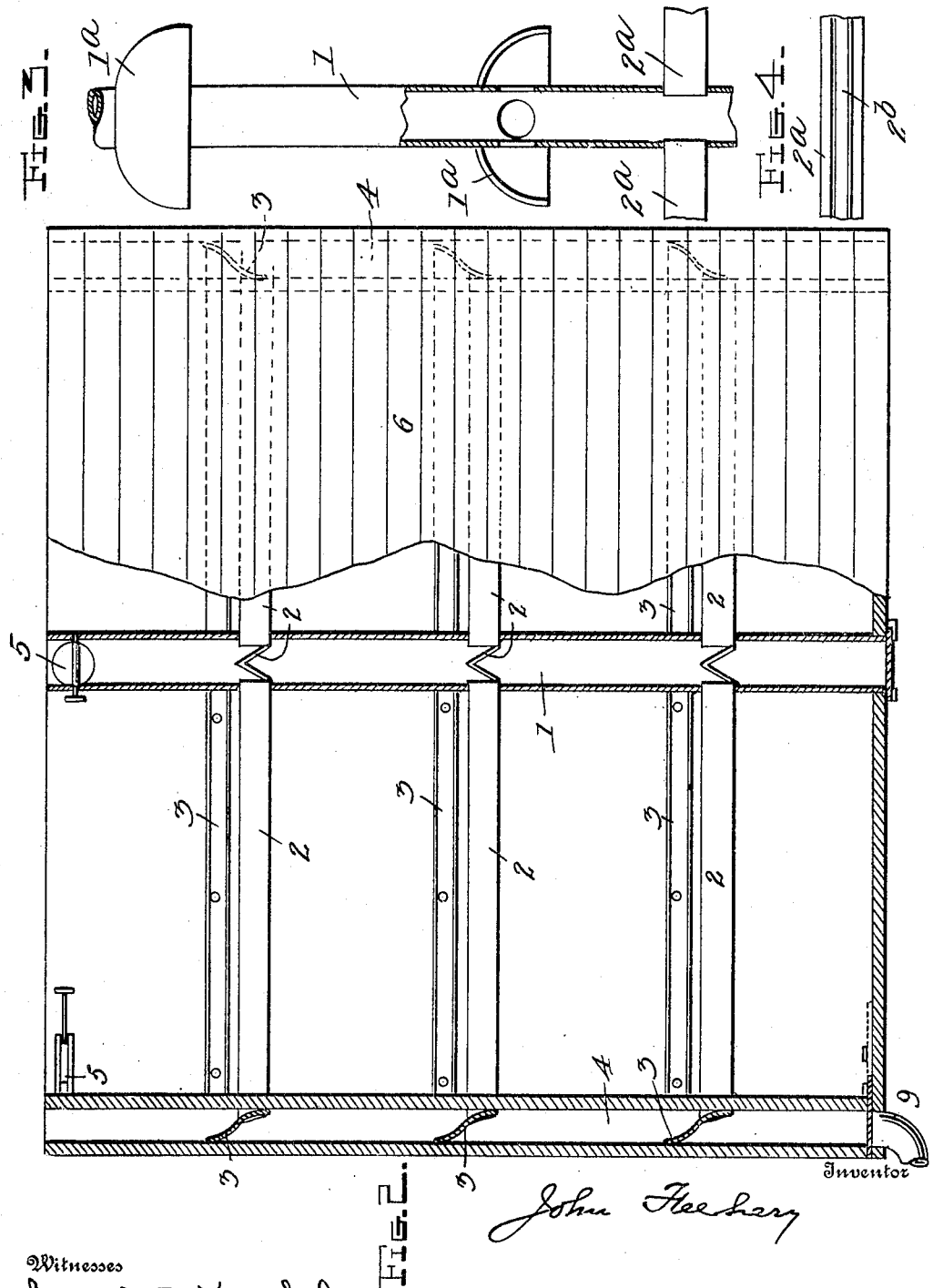

UNITED STATES PATENT OFFICE.

JOHN FEEHERY, OF CAMPUS, ILLINOIS.

GRAIN-BIN VENTILATOR.

No. 856,457.  Specification of Letters Patent.  Patented June 11, 1907.

Application filed March 1, 1907. Serial No. 359,961.

*To all whom it may concern:*

Be it known that I, JOHN FEEHERY, a citizen of the United States, residing at Campus, in the county of Livingston and State of Illinois, have invented certain new and useful Improvements in Grain-Bin Ventilators, of which the following is a specification.

This invention is a ventilator for grain bins, and consists of a series of ventilating pipes or devices running through a grain bin or bins at certain intervals and affording ducts or conduits through which hot air in the grain may escape. The pipes or conduits also provide means whereby artificial ventilation may be produced. This is done by connecting the ventilating tubes or pipes with a blower or fan, which causes the air to pass out of said pipes and into and through the grain within the bins, thereby causing moisture to be removed and curing and drying the grain and protecting the same against rotting, heating and other conditions which injuriously affect grain stored in bins.

The invention is illustrated in the accompanying drawings, in which

Figure 1 is a plan view of the bin provided with the invention. Fig. 2 is a side elevation, partly in section. Fig. 3 is a detail in elevation, partly in section, of a modification. Fig. 4 is an enlarged plan view of one of the air pipes shown in Fig. 3. Fig. 5 is a sectional elevation of a grain elevator, illustrating a grain bin and an air escape tube therein.

Referring specifically to the drawings, 6 indicates the wall of a bin, which may be inclosed on all sides and communicates by a tube 7 with a cupola 8 or other outlet through the top of the elevator.

Standing vertically in the middle of the bin is a tube 1 extending from the top to the bottom thereof and open at opposite ends to allow air to pass therethrough. Extending horizontally or laterally from this tube are a series of inverted V-shaped metal or wood conduits indicated at 2. These are inverted or open on the under side, so that the grain will not lodge thereon, and so that air may pass from the grain into the conduits, or vice versa. The inner ends of the conduits 2 project into the tube 1, through openings in the wall thereof, and the outer ends of said conduits project into or under conduits 3 extending along the walls of the bin. These conduits are formed of curved pieces of metal or the like secured at the upper edge to the walls of the bin and flared out therefrom so as to form passages thereunder to allow the circulation of air. At the corners the side conduits 3 are connected to vertical or upright air vents or shafts 4, built in the corners of the bin. The tube 1 and the ventilating shaft 4 are provided with slides or dampers 5 so that they may be closed at either end when desired. Also, one or more of the shafts 4 is connected at the lower end to a pipe 9 which may be connected with a fan or blower.

It will be seen that by means of the system of tubes and conduits natural ventilation is afforded to air which enters the conduits 2 from below and passes thence into the upright tube 1 or into the conduits 3 and thence to the shafts 4, the dampers 5 at the top being in this event open to allow the escape of the heated air through the outlet pipe 7 at the top of the bin. The location of the conduits at different heights gives ventilation at all depths of the bin, and the middle tube 1, side conduits 3 and cross conduits 2 gives good and sufficient ventilation from all parts or sides of the bin.

When artificial ventilation is used or desired all the dampers are closed except the one controlling the inlet pipe 9 from the fan. This causes the air supplied by the fan to pass from the pipes and conduits outwardly into the grain, thus giving a reverse or artificial ventilation, producing a circulation throughout all the grain in the bin. By connecting the pipes or conduits of different bins such circulation can be extended throughout a series of bins, or all the bins in an elevator.

In the modified form shown in Fig. 3 the vertical air pipe 1 has openings $1^b$ in the side thereof, covered by inverted cups $1^a$ which prevent any grain from getting into the pipes. Also instead of the inverted V-shaped conduits 2, air pipes $2^a$ may be used, which are connected to the upright pipe 1 and which are provided on the under side with a slot $2^b$ through which air can either enter or escape as natural or artificial ventilation is used.

The conduits 2, 3 and $2^a$, as well as the cups $1^a$, will shed any grain which may rest thereon so that various kinds of grain may be stored in succession in the same bin without having to clean all the ventilating pipes.

I claim:

1. A ventilator for bins, comprising an upright pipe at the middle of the bin, upright shafts at the sides of the bin, horizontal side conduits extending around the walls of the bin and connected and opening into the shafts, and cross conduits extending from the middle pipe to the side conduits, all of said conduits being open on the under side.

2. A ventilator for bins, comprising a system of vertical and horizontal conduits connected together and located within the bin, the horizontal conduits having openings on the under side thereof, and the vertical conduits having dampers at the top and bottom thereof, and an air blast pipe leading into the conduits and arranged to deliver a blast therefrom into the grain in the bin when said dampers are closed.

3. A ventilator for bins, comprising an upright air pipe at the middle of the bin, upright shafts in the corners of the bin, a series of horizontal conduits extending along the sides of the bin and opening into the shafts and consisting of flared plates secured at their upper edge to the side walls and spaced therefrom at their lower edge, and diametrical conduits open on the under side and extending from the air pipe to the side conduits.

In testimony whereof I affix my signature, in presence of two witnesses.

JOHN FEEHERY.

Witnesses:
  J. V. REILLY,
  WILLIAM FLOOD.